No. 825,778. PATENTED JULY 10, 1906.
G. D. VON PHUL.
CANE CARRIER FEEDER.
APPLICATION FILED APR. 25, 1906.
3 SHEETS—SHEET 2.
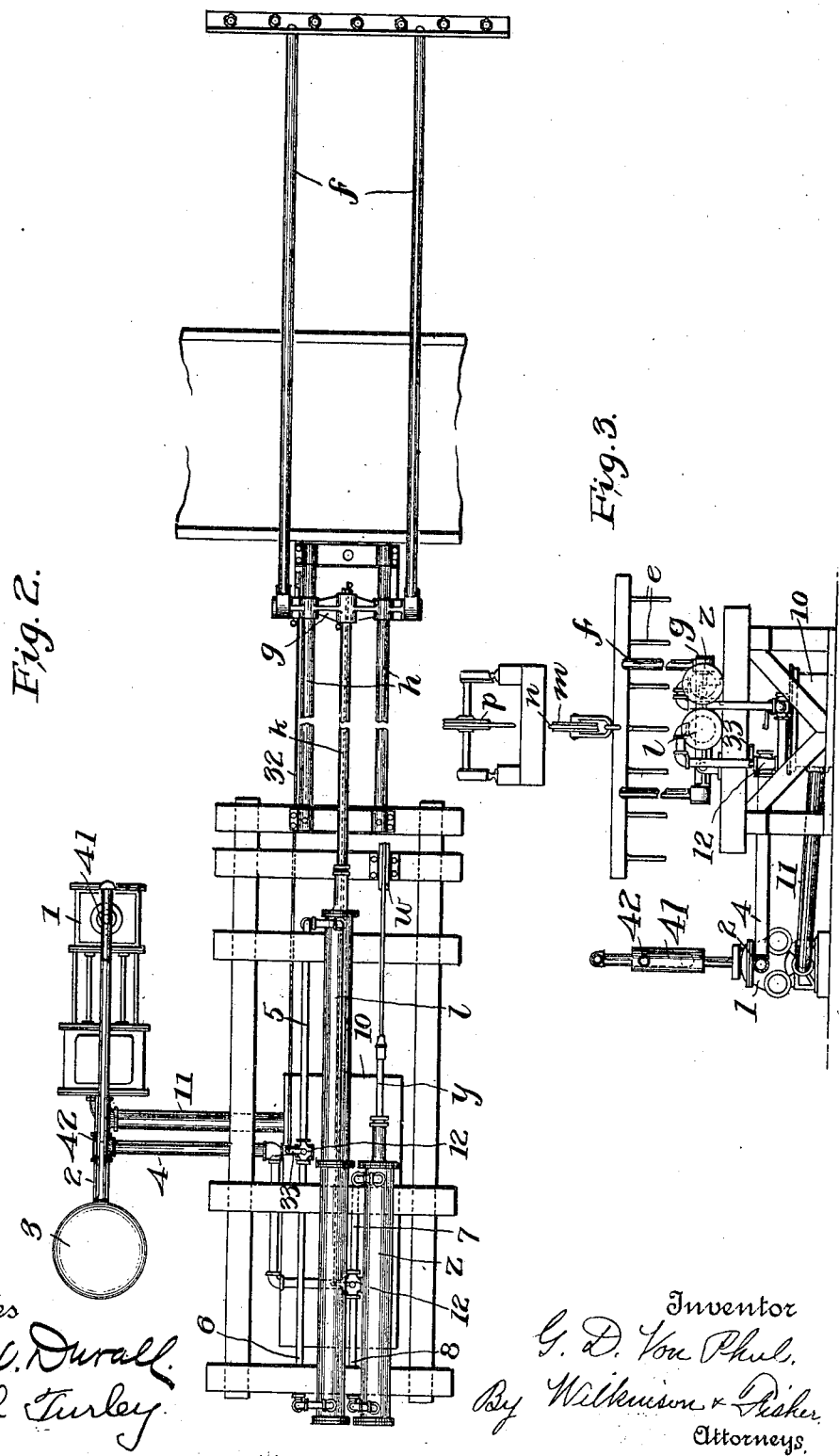
Witnesses
W. May. Durall
Samuel Turley
Inventor
G. D. Von Phul.
By Wilkinson & Fisher
Attorneys.

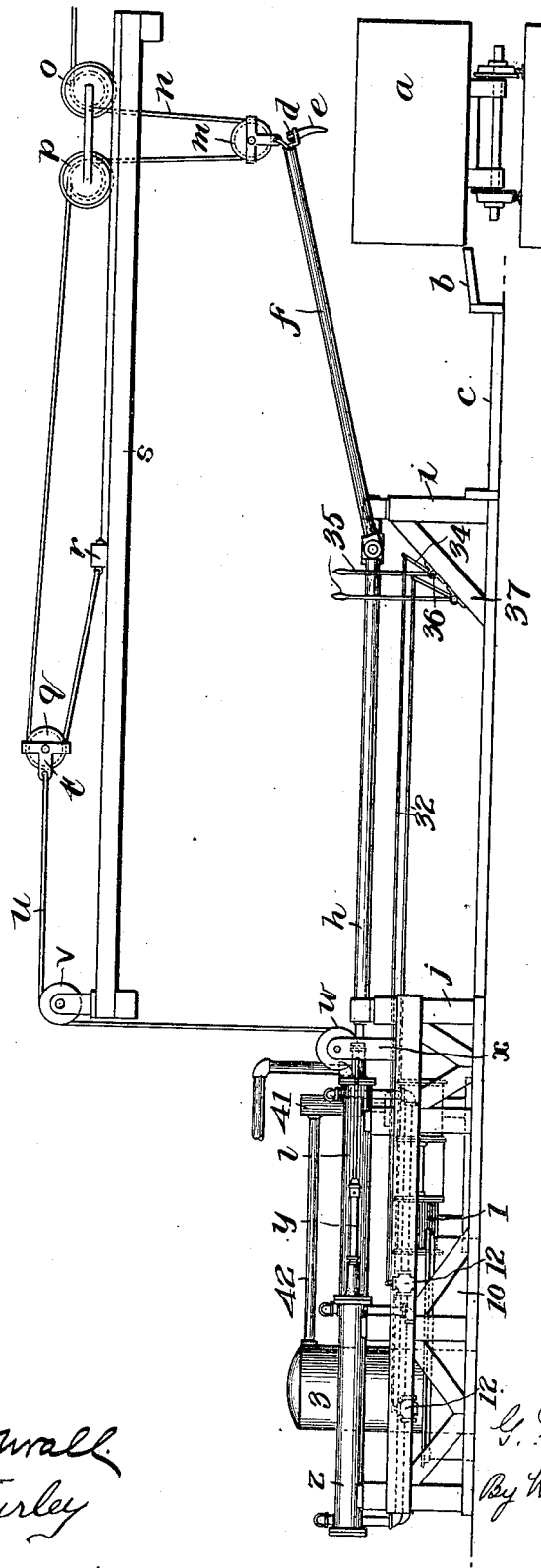

No. 825,778. PATENTED JULY 10, 1906.
G. D. VON PHUL.
CANE CARRIER FEEDER.
APPLICATION FILED APR. 25, 1906.
3 SHEETS—SHEET 3.
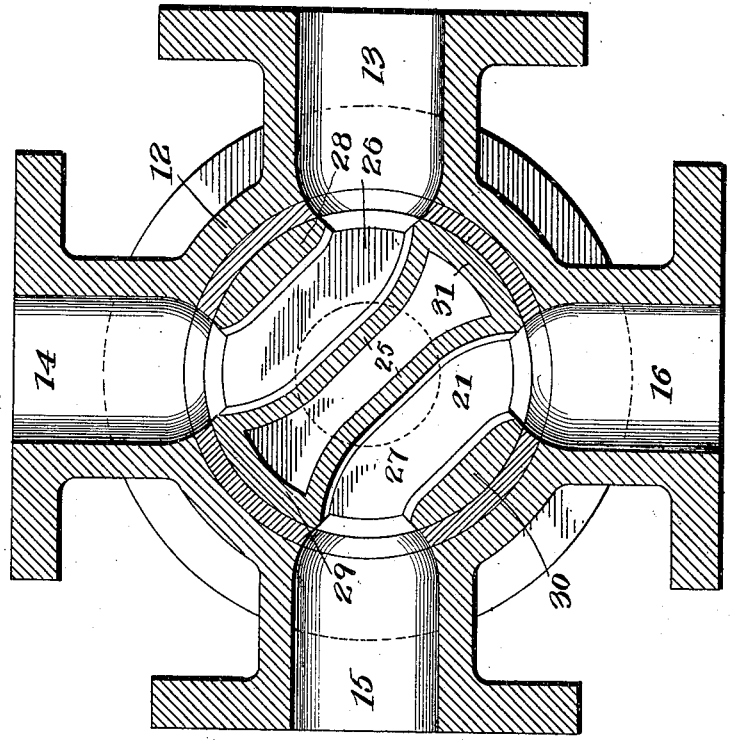
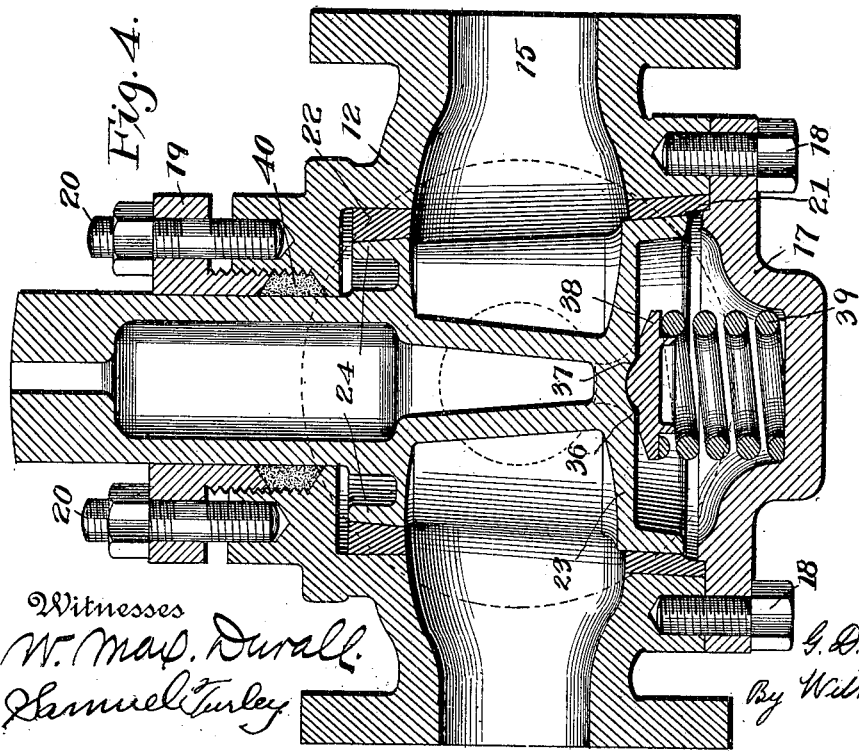
Witnesses
W. May. Durall.
Samuel Turley
Inventor
G. D. Von Phul.
By Wilkinson & Fisher
Attorneys

UNITED STATES PATENT OFFICE.

GILBERT D. VON PHUL, OF BATON ROUGE, LOUISIANA.

CANE-CARRIER FEEDER.

No. 825,778.　　　Specification of Letters Patent.　　　Patented July 0, 1906.

Application filed April 25, 1906. Serial No. 313,702.

*To all whom it may concern:*

Be it known that I, GILBERT D. VON PHUL, a citizen of the United States, residing at Baton Rouge, in the parish of East Baton Rouge and State of Louisiana, have invented certain new and useful Improvements in Cane-Carrier Feeders; and I do hereby declare the following to be a full, clear, and exact description of the invention, such as will enable others skilled in the art to which it appertains to make and use the same.

My invention relates to improvements in cane-carrier feeders; and the object of my invention is to provide a simple device of this character whereby the cane may be unloaded from cars carrying the same, said feeder being operated by hydraulic means.

With this object in view my invention consists in the construction and combination of parts, as hereinafter described and claimed.

In the accompanying drawings, Figure 1 is a side elevation of my invention. Fig. 2 is a top plan view thereof. Fig. 3 is an end elevation thereof. Fig. 4 is a longitudinal vertical section through one of the controlling-valves, and Fig. 5 is a longitudinal horizontal section of the same.

$a$ represents a car loaded with cane running upon an ordinary track, said car being provided with a removable side, so that the cane may be easily raked therefrom onto chute $b$, which delivers into the trough $c$, in which the cane-carrier (not shown) runs. $d$ represents the rake, which is composed of a head provided with downwardly-projecting curved teeth $e$, and this rake is carried on the ends of two parallel rods $f$, each of which on the end opposite the rake is pivotally mounted upon the ends of a horizontally-sliding cross-piece $g$. This cross-piece is provided with perforations which slip over the guide-rods $h$, suitably supported by the frames $i$ and $j$.

The cross-piece $g$ is attached to a piston-rod $k$, which carries a piston on one end, which works in the hydraulic cylinder $l$, as hereinafter described. It is obvious that the reciprocation of the piston in the cylinder $l$ will move the rake $d$ forward and back. Means are also provided for raising and lowering the rake $d$ at the proper time. Pivoted to the central part of the rake $d$ is a pulley $m$, over which runs a cord $n$, one end of which passes over a pulley $o$ and thence to a fixed support (not shown) and the other end of which passes over a pulley $p$ and thence over a movable pulley $q$ and down to a fixed support $r$ on the framing $s$. The pulleys $o$ and $p$ are fixed relatively to each other, but are slidably mounted on a track on the beam $s$ and are free to rotate, while the pulleys $m$ and $q$ are free to rotate and are also movable. On the axle of the pulley $q$ is mounted a hook $t$, to which is connected a cord or rope $u$, which passes over guide-pulleys $v$ and $w$, the pulley $v$ being supported on the upper framing $s$ and the pulley $w$ being supported on a beam $x$ of the lower framing. The cord $u$ is attached to one end of the piston-rod $y$, which works in a hydraulic piston $z$. It is obvious that the reciprocation of the piston-rod $y$ will raise and lower the rake $d$.

The pistons in the hydraulic cylinders $l$ and $z$ are driven by hydraulic means, such as water operated by the duplex pump 1, which pump delivers, by means of a pipe 2, into an air-cylinder 3, by means of which a steady and uniform pressure is kept on the fluid in the pipe 2. The pump is supplied with a governor 41, connected by the pipe 42 to the cylinder 3, by which the pressure is kept constant at all times.

To the pipe 2 is connected the pipe 4 for supplying fluid to the hydraulic cylinders $l$ and $z$, said pipe having branch pipes 5 and 6 leading to the respective ends of the hydraulic cylinder $l$ and having pipes 7 and 8 leading to the respective ends of the hydraulic cylinder $z$. 10 represents a tank located underneath the meeting-points of the pipes 5 6 7 8, and 11 represents a return-pipe leading from said tank back to the pump, so that the same supply of water may be used repeatedly. To govern the flow of water to the hydraulic cylinders $l$ and $z$, I use a peculiarly-constructed valve 12, one of these valves being located at the junction of the pipes 5 and 6 and another being located at the junction of the pipes 7 and 8. These valves are shown on an enlarged scale in Figs. 4 and 5.

The casing of the valve 12 is provided with four openings or ports 13, 14, 15, and 16, the port 13 engaging with the pipe 5, the port 14 engaging with the pipe 4, the port 15 engaging with the pipe 6, and the port 16 being open to the atmosphere. The casing of the valve 12 is made in one piece and on the bottom is closed by head 17, secured to the valve-casing by bolts 18, and the top is closed by an annular head 19, screw-threaded into the top of the casing of the valve 12 and secured in position by bolts 20. The interior of the valve-casing is cored out, and linings 21 and 22, preferably of brass ground and forced into position, are provided with faces which serve as valve-seats.

The valve is of the form shown in Figs. 4 and 5. It is preferably made of brass and provided with heads 23 and 24, which contact with the linings 21 and 22, respectively. These heads are connected by double central web 25, the valve preferably being made hollow for the sake of saving weight and material. The valve is provided with two passages 26 and 27 and with four bearing-faces 28, 29, 30, and 31, each about one-sixth of a circle. The valve in the casing 12, located at the junction of pipes 5 and 6, is operated by an arm 32, pivoted to a handle 33 in the upper end of the valve. The arm 32 is pivotally connected at one end to one arm 34 on a bell-crank lever, which is provided with an operating-handle 35, pivoted, as shown at 36, on the beam 37.

The construction of the valve at the junction of the pipes 7 and 8 is precisely the same as that already described, and it is operated in the same way.

The operation is as follows: The parts being in the position shown in Fig. 1, it is desired to first lower the rake. This is shown by causing the piston-rod $y$ to move to the right from the position shown in Fig. 2, and in this case the valve at the junction of the pipes 7 and 8 will be shifted ninety degrees from the position shown in Fig. 5. This will permit the rake to drop, which it does of its own weight. When the rake has dropped far enough, the valve is moved so as to stop the flow of water into or out of the cylinder $z$ by moving the valve about thirty degrees. The rake is then withdrawn by means of the hydraulic pressure acting on the cylinder $l$. The valve in the casing 12 is moved into the position shown in Fig. 5, whereupon the fluid rushes in through the pipe 4, the port 14, the passage 26, and the port 13 and through the pipe 5 into one end of the cylinder $l$, while the fluid that is already in the other end of the cylinder is discharged through the pipe 6, port 15, passage 27, and port 16 into the tank 10. This is continued until the rake has been pulled far enough away from the car, when the operation is stopped by the movement of the hand-lever 35, and the rake is again lifted and carried forward into the car, when it is again dropped, the operation being then repeated.

Each of the valves described is provided with a depression 36 on its lower face, into which fits a projection 37 of a bearing-plate 38, against which a stout springs 39 bears, thus holding the valve in position, but permitting it to rotate freely. The valve itself and also the valve-seats 21 and 22 are made slightly conical, and the valve is slipped into the casing from the bottom, the head 17 being removed. I prefer to use a packing, such as 40, between the head 19 and the top of the valve-casing.

Having thus described my invention, what I claim as new, and desire to secure by Letters Patent of the United States, is—

1. In a cane-carrier feeder, the combination of a pump, a hydraulic cylinder, a piston in said cylinder, a rake, connections between said piston and said rake, pipe connections between the ends of the said cylinder and said pump, a valve in said connections adapted to cut off and to reverse the flow of fluid in and through said hydraulic cylinder, and means for operating said valve, substantially as described.

2. In a cane-carrier feeder, the combination of a pipe, an air-cylinder pump, a pump connected thereto, a hydraulic cylinder, a piston in said cylinder, a rake, connections between said piston and said rake, pipe connections between said pump and the opposite ends of said cylinder, a valve for stopping or reversing the flow of fluid in the pipes leading to the ends of said cylinder, and means for operating said valve, substantially as described.

3. In a cane-carrier feeder, the combination of a pivotally-supported rake and means for raising and lowering said rake, consisting of a system of fast and loose pulleys, ropes passing over said pulleys, a hydraulic cylinder with a piston therein, one of said ropes being connected to said piston, and means for moving said piston, substantially as described.

4. In a cane-carrier feeder, the combination of a rake, a cross-piece to which said rake is pivoted, guides for said cross-piece, a hydraulic cylinder, a piston therein, a piston-rod connecting said piston and said cross-piece, and means for moving said piston in opposite directions, substantially as described.

5. In a cane-carrier feeder, the combination of a rake, a movable cross-piece to which said rake is pivotally connected, guides for said cross-piece, hydraulic means for moving said cross-piece back and forth, means for raising and lowering said rake, consisting of a system of fixed and movable pulleys, such movable pulleys being connected to said rake-head, cords or ropes passing over said pulleys, hydraulic means connected to one of said cords or ropes, and means for actuating both of said hydraulic means, substantially as described.

In testimony whereof I affix my signature in presence of two witnesses.

GILBERT D. VON PHUL.

Witnesses:
BRANTLY FURNIER,
E. M. EDAM.